United States Patent
Lee et al.

(10) Patent No.: US 10,378,725 B2
(45) Date of Patent: Aug. 13, 2019

(54) LIGHT EMITTING MODULE AND LENS

(71) Applicant: Seoul Semiconductor Co., Ltd., Ansan-si (KR)

(72) Inventors: Jang Weon Lee, Ansan-si (KR); Sung Ki Hwang, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 15/678,605

(22) Filed: Aug. 16, 2017

(65) Prior Publication Data

US 2018/0051863 A1 Feb. 22, 2018

(30) Foreign Application Priority Data

Aug. 18, 2016 (KR) .................. 10-2016-0104773

(51) Int. Cl.
| | |
|---|---|
| F21V 5/04 | (2006.01) |
| F21V 5/08 | (2006.01) |
| G02B 19/00 | (2006.01) |
| F21Y 115/10 | (2016.01) |
| F21V 5/00 | (2018.01) |
| F21V 17/00 | (2006.01) |
| F21V 17/06 | (2006.01) |
| F21W 131/103 | (2006.01) |

(52) U.S. Cl.
CPC ............... *F21V 5/04* (2013.01); *F21V 5/08* (2013.01); *G02B 19/0014* (2013.01); *G02B 19/0061* (2013.01); *F21V 5/007* (2013.01); *F21V 17/005* (2013.01); *F21V 17/06* (2013.01); *F21W 2131/103* (2013.01); *F21Y 2115/10* (2016.08)

(58) Field of Classification Search
CPC ........................................................ F21V 5/04
See application file for complete search history.

(56) References Cited

U.S. PATENT DOCUMENTS

| | | |
|---|---|---|
| 9,080,739 B1 | 7/2015 | Sayers |
| 2004/0070855 A1 | 4/2004 | Benitez et al. |
| 2010/0271708 A1 | 10/2010 | Wilcox |

(Continued)

FOREIGN PATENT DOCUMENTS

EP   2765445   *   8/2013

OTHER PUBLICATIONS

English machine translation of Dobos EP 2765445 (Year: 2013).*
Extended European Search Report dated Feb. 1, 2018, in European Patent Application No. 17186605.6.

*Primary Examiner* — Evan P Dzierzynski
(74) *Attorney, Agent, or Firm* — H.C. Park & Associates, PLC (57) ABSTRACT

A light emitting module includes a substrate, a light emitting diode chip, and a lens. The light emitting diode chip is disposed on the substrate. The lens is coupled to the substrate and covers the light emitting diode chip. The lens includes a light incident surface and a light exit surface. The light incident surface receives light from the light emitting diode chip. The light exit surface outputs the light from the lens. The light incident surface includes a concave light incident surface and a convex light incident surface. The concave light incident surface overlaps the light emitting diode. The convex light incident surface extends from the concave light incident surface.

19 Claims, 9 Drawing Sheets

(56) References Cited

U.S. PATENT DOCUMENTS

| | | | |
|---|---|---|---|
| 2012/0087122 A1* | 4/2012 | Takeuchi | G02F 1/133603 |
| | | | 362/235 |
| 2012/0120666 A1 | 5/2012 | Moeller | |
| 2014/0239331 A1* | 8/2014 | Oyu | H05K 13/046 |
| | | | 257/98 |
| 2015/0036353 A1* | 2/2015 | Kim | F21K 9/60 |
| | | | 362/311.02 |
| 2015/0041837 A1 | 2/2015 | Chinniah et al. | |
| 2015/0323729 A1* | 11/2015 | Takatori | G02F 1/133603 |
| | | | 362/606 |
| 2016/0186959 A1* | 6/2016 | Kim | F21V 5/04 |
| | | | 362/311.02 |

* cited by examiner

LIGHT EMITTING MODULE AND LENS

CROSS-REFERENCE TO RELATED APPLICATION

This application claims priority from and the benefit of Korean Patent Application No. 10-2016-0104773, filed Aug. 18, 2016, which is hereby incorporated by reference for all purposes as if fully set forth herein.

BACKGROUND

Field

Exemplary embodiments generally relate to a light emitting module and a lens, and, more particularly, to a light emitting module and a lens that can be used in a streetlamp to illuminate a road.

Discussion

A light emitting diode may be formed from an inorganic semiconductor device that emits light through recombination of electrons and holes. Light emitting diodes have been widely used in various fields, such as displays, automotive lamps, and general lighting. Light emitting diodes have relatively long lifespans, low power consumption, and fast response time, and, thus, are quickly replacing existing light sources. For instance, light emitting diodes tend to replace existing light sources for streetlamps for illuminating roads. A streetlamp is generally placed higher than a user so as to emit light in a particular direction. That is, a streetlamp is typically used to illuminate a wide range of regions without illuminating other regions. As such, a streetlamp may be required to emit light in an asymmetrical manner at a point of installation.

The above information disclosed in this section is only for enhancement of an understanding of the background of the inventive concepts, and, therefore, it may contain information that does not form prior art already known to a person of ordinary skill in the art.

SUMMARY

Some exemplary embodiments are capable of providing a light emitting module and a lens that can permit light emitted from a light emitting diode chip to be discharged through the lens in a desired direction by preventing the light emitted from the light emitting diode chip from entering a flange of the lens.

Additional aspects will be set forth in the detailed description which follows, and, in part, will be apparent from the disclosure, or may be learned by practice of the inventive concepts.

According to some exemplary embodiments, a light emitting module may include a substrate, a light emitting diode chip, and a lens. The light emitting diode chip may be disposed on the substrate. The lens may be coupled to the substrate and may cover the light emitting diode chip. The lens may include a light incident surface and a light exit surface. The light incident surface may receive light from the light emitting diode chip. The light exit surface may output the light from the lens. The light incident surface may include a concave light incident surface and a convex light incident surface. The concave light incident surface may overlap the light emitting diode. The convex light incident surface may extend from the concave light incident surface.

A lower surface of the light emitting diode chip may adjoin a lower surface of the lens to be flush with each other on the substrate.

The convex light incident surface may extend from the concave light incident surface to a lower surface of the lens.

A side upper end of the light emitting diode chip may be between a border between the concave light incident surface and the convex light incident surface and a border between the convex light incident surface and a lower surface of the lens.

A height of the light emitting diode chip from an upper surface of the substrate may be smaller than a height from the upper surface of the substrate to a border between the concave light incident surface and the convex light incident surface.

The lens may further include a lower surface and a flange. The lower surface may adjoin the substrate. The flange may connect the light exit surface to the lower surface of the lens.

Locations of a central axis of the light incident surface and a central axis of the light exit surface may be different.

The light exit surface may include two convex light exit surfaces and a concave light exit surface. The concave light exit surface may be between the two convex light exit surfaces. The concave light exit surface may connect the two convex light exit surfaces.

The light emitting diode chip may be configured to emit light through upper and side surfaces of the light emitting diode chip.

The light emitting diode chip may include a pair of electrodes and a light emitting structure. The light emitting structure may overlap the pair of electrode pads. The light emitting structure may include an n-type semiconductor layer, a p-type semiconductor layer, and an active layer between the n-type semiconductor layer and the p-type semiconductor layer.

The light emitting diode chip may further include a phosphor layer covering upper and side surfaces of the light emitting structure. The phosphor layer may be configured to convert wavelengths of light emitted from the light emitting structure.

The lens may further include a plurality of legs on a lower side thereof. The plurality of legs may contact the substrate.

The substrate may include a plurality of securing grooves configured to receive the plurality of legs.

The light emitting diode chip may be one of a plurality of light emitting diode chips on the substrate.

According to some exemplary embodiments, a lens may include a light incident surface and a light exit surface. The light incident surface may be configured to receive light from a light emitting diode chip. The light exit surface may be configured to output the light from the lens. The light incident surface may include a concave light incident surface and a convex light incident surface. The concave light incident surface may be configured to overlap the light emitting diode chip. The convex light incident surface may extend from the concave light incident surface.

The lens may further include a lower surface. The lens may be configured to overlap the light emitting diode chip so that the lower surface of the lens can be flush with a lower surface of the light emitting diode.

The convex light incident surface may extend from the concave light incident surface to the lower surface of the lens.

The light exit surface may include two convex light exit surfaces and a concave light exit surface. The concave light exit surface may be between the two convex light exit surfaces. The concave light exit surface may connect the two convex light exit surfaces.

The lens may further include a plurality of legs on a lower surface of the lens. The plurality of legs may be configured to contact a substrate supporting the light emitting diode.

The light incident surface may be configured to overlap a plurality of light emitting diode chips. The plurality of light emitting diode chips may include the light emitting diode chip.

According to various exemplary embodiments, a light emitting module may have an effect of increasing intensity of light via a lens that can refract light emitted through a side surface of a light emitting diode chip in an upper direction of the lens. In addition, even in a structure of a streetlamp provided with a plurality of light emitting modules, each of the light emitting modules may be configured to allow light emitted from the light emitting diode chip to be discharged to the outside instead of being trapped by a flange of the lens, thereby improving the intensity of light.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
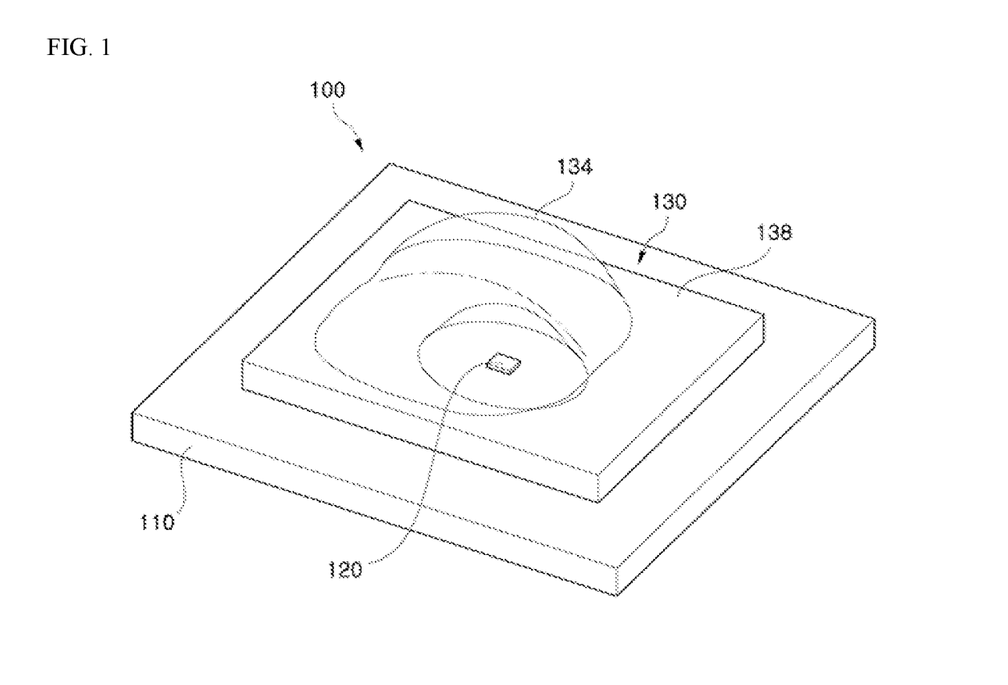
FIG. 1 is a perspective view of a light emitting module according to some exemplary embodiments.
Figure 2:
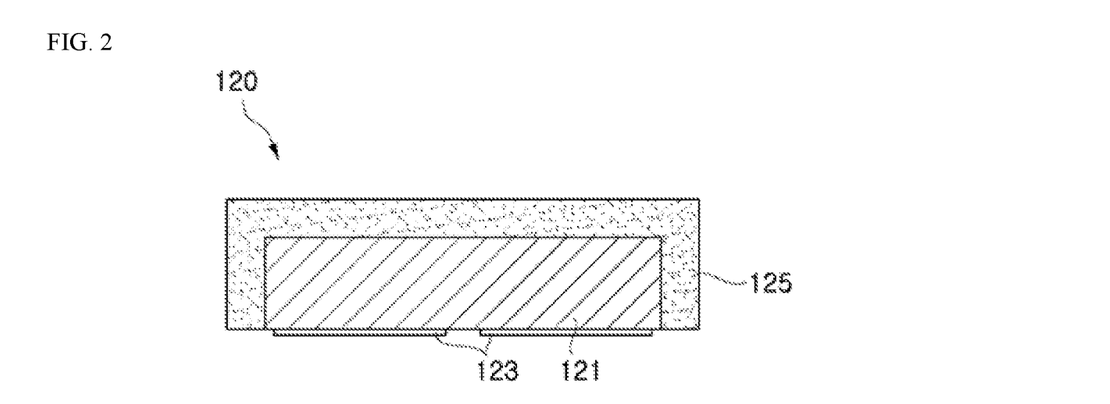
FIG. 2 is a sectional view of a light emitting diode chip in the light emitting module according to some exemplary embodiments.
Figure 3:
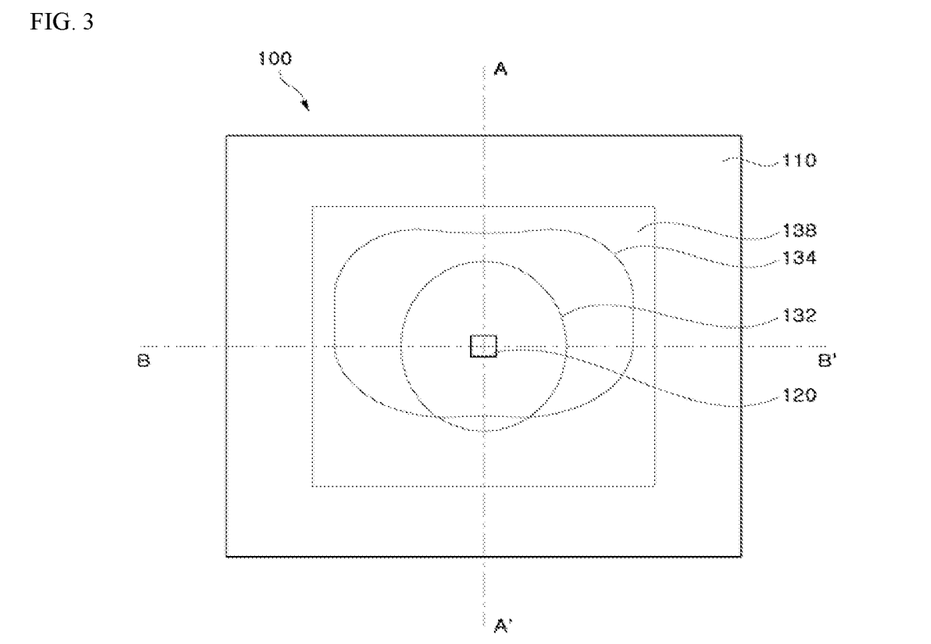
FIG. 3 is a plan view of the light emitting module of FIG. 1 according to some exemplary embodiments.
Figure 4:
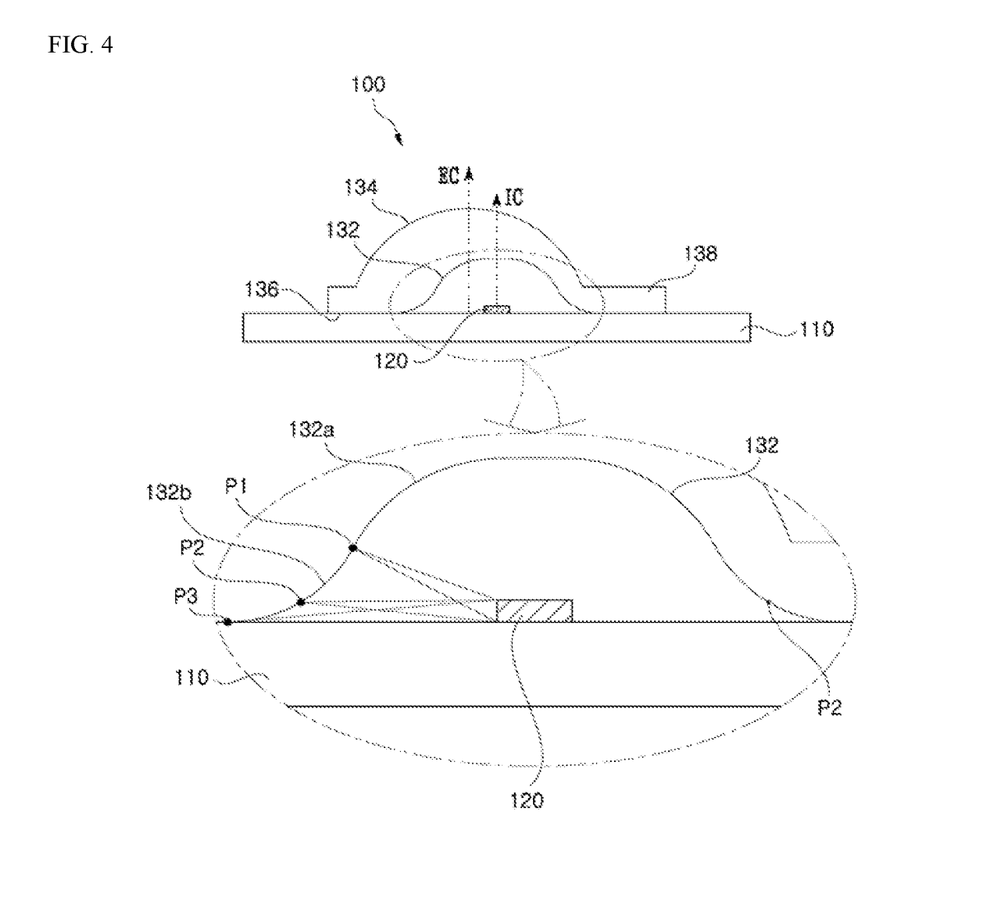
FIG. 4 is a cross-sectional view of the light emitting module of FIG. 3 taken along sectional line A-A' according to some exemplary embodiments.
Figure 5:
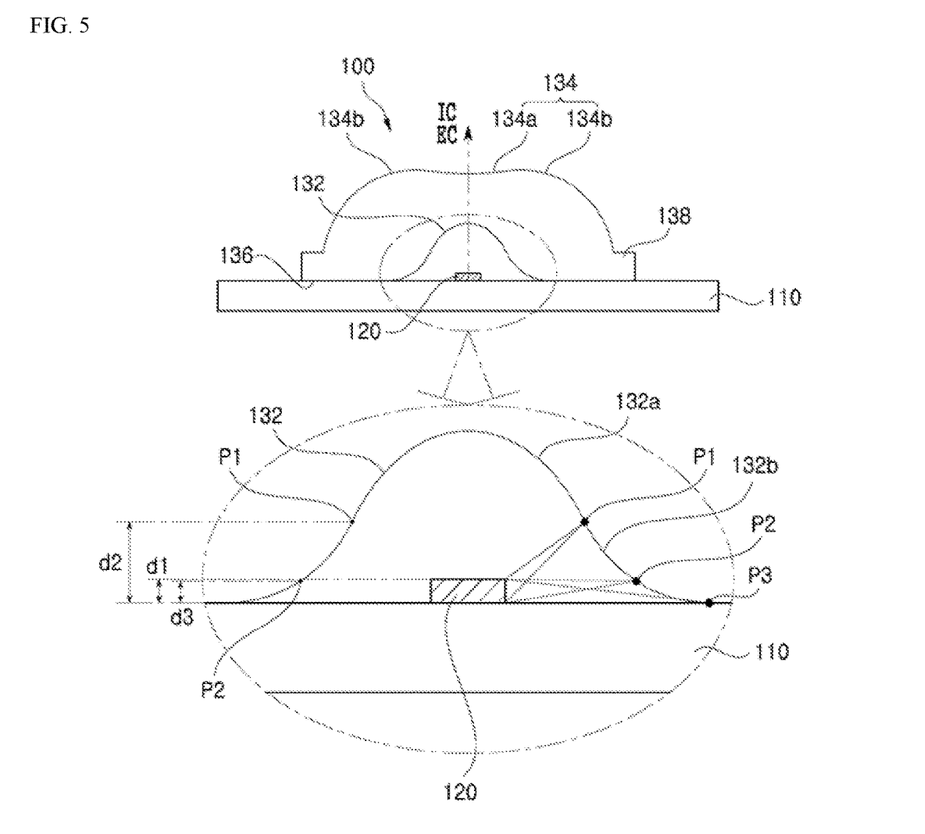
FIG. 5 is a cross-sectional view of the light emitting module of FIG. 3 taken along sectional line B-B' according to some exemplary embodiments.

FIG. 1 is a perspective view of a light emitting module according to some exemplary embodiments. FIG. 2 is a sectional view of a light emitting diode chip in the light emitting module according to some exemplary embodiments. FIG. 3 is a plan view of the light emitting module of FIG. 1 according to some exemplary embodiments. FIG. 4 is a cross-sectional view of the light emitting module of FIG. 3 taken along sectional line A-A' according to some exemplary embodiments. FIG. 5 is a cross-sectional view of the light emitting module of FIG. 3 taken along sectional line B-B' according to some exemplary embodiments.

According to various exemplary embodiments, a light emitting module 100 includes a substrate 110, a light emitting diode chip 120, and a lens 130.

The substrate 110 serves to support the light emitting diode chip 120 mounted thereon, and may be an insulating substrate, a conductive substrate, a printed circuit board, and/or the like. For example, the substrate 110 may be at least one of a sapphire substrate, a gallium nitride substrate, a glass substrate, a silicon carbide substrate, a silicon substrate, a metal substrate, and a ceramic substrate. In addition, the substrate 110 may have a plurality of conductive patterns or circuit patterns formed thereon that are electrically connected to the light emitting diode chip 120 mounted thereon.

The light emitting diode chip 120 is mounted on the substrate 110, and includes a light emitting structure 121 and electrode pads 123, as shown in FIG. 2.

The light emitting structure 121 includes an n-type semiconductor layer and a p-type semiconductor layer, and may be configured to emit light through recombination of electrons and holes. In addition, an active layer may be interposed between the n-type semiconductor layer and the p-type semiconductor layer.

The light emitting structure 121 may be formed at a lower surface of the light emitting diode chip 120 with a pair of electrode pads 123 to which the conductive patterns of the substrate 110 are electrically connected. In this manner, the pair of electrode pads 123 may be disposed between the light emitting structure 121 and the substrate 110. Accordingly, when electric power is supplied to the substrate 110 (e.g., the conductive patterns on or in the substrate 110), the electrical power can be supplied to the light emitting structure 121 through the electrode pads 123. In some exemplary embodiments, the electrode pads 123 protrude from a lower surface 136 of the light emitting structure 121. Alternatively, the electrode pads 123 may be formed flush with the lower surface 136 of the light emitting structure 121 or placed higher than the lower surface 136 of the light emitting structure 121.

According to some exemplary embodiments, with the structure having the light emitting diode chip 120 including the light emitting structure 121 and the pair of electrode pads 123, light emitted from the light emitting structure 121 can be emitted through upper and side surfaces of the light emitting diode chip 120, as will become more apparent below.

In some exemplary embodiments, light emitted from the light emitting structure 121 may be blue light or ultraviolet (UV) light. To this end, the light emitting diode chip 120 may further include a phosphor layer 125. As described above, since the light emitted from the light emitting structure 121 can be discharged through the upper and side surfaces of the light emitting structure 121, the phosphor layer 125 may be formed to cover the upper and side surfaces of the light emitting structure 121. The phosphor layer 125 may cover the entirety of the upper and side surfaces of the light emitting structure 121, and may include a polymer resin, such as a silicone resin or a ceramic material, such as glass and alumina. The phosphor layer 125 may be formed by conformal coating to cover the entirety of the upper and side surfaces of the light emitting structure 121.

The phosphor layer 125 may include at least one kind of phosphor capable of converting wavelengths of light emitted from the light emitting structure 121. Light emitted from the light emitting structure 121 may be converted into white light through wavelength conversion of the phosphor layer 125, whereby the white light can be discharged to the outside of the light emitting structure 121. The phosphor contained in the phosphor layer 125 may include at least one of, for example, cyan phosphors, garnet phosphors, aluminate phosphors, sulfide phosphors, oxynitride phosphors, nitride phosphors, fluoride phosphors, and silicate phosphors.

According to some exemplary embodiments, the light emitting diode chip 120 includes the phosphor layer 125 covering the outer surface of the light emitting structure 121, and may further include a molding part covering the entirety of an outer surface of the phosphor layer 125, although not shown in the drawings. Like the phosphor layer 125, the molding part may include a polymer resin, such as a silicone resin or a ceramic material, such as glass and alumina. That is, according to one or more exemplary embodiments, the light emitting diode chip 120 may be directly mounted on the substrate 110 and light emitted from the light emitting diode chip 120 can be discharged to the outside not only through an upper surface of the light emitting diode chip 120, but also through the side surface thereof.

The lens 130 serves to spread or collect light emitted from the light emitting diode chip 120. The lens 130 includes a light incident surface 132 through which light emitted from the light emitting diode chip 120 enters the lens 130, and a light exit surface 134 through which light entering the lens 130 exits the lens 130. As shown in FIGS. 4 and 5, the lens 130 may further include a lower surface 136 adjoining the substrate 110 and a flange 138 outside the light exit surface 134.

As shown in FIGS. 4 and 5, the light incident surface 132 may have a concave shape to allow light emitted from the light emitting diode chip 120 to enter the lens 130 through the light incident surface 132. In other words, the light incident surface 132 may be concave with respect to the position of the light emitting diode chip 120. The light incident surface 132 may include a concave light incident surface 132a and a convex light incident surface 132b. In other words, the light incident surface 132 may be a complex surface with at least one inflection point between concave and convex portions, e.g., between concave light incident surface 132a and convex light incident portion 132b. The concave light incident surface 132a is disposed above the light emitting diode chip 120 and may have a central axis IC of the light incident surface 132 at the center thereof. The convex light incident surface 132b may extend from the concave light incident surface 132a towards the lower surface 136 of the lens 130. At a border between the concave light incident surface 132a and the convex light incident surface 132b, a first point P1 corresponding to an inflection point at which a radius of curvature of the light incident surface 132 is changed is position (see, e.g., cross-sectional views of FIGS. 4 and 5).

According to some exemplary embodiments, the lens 130 is mounted on an upper surface of the substrate 110 such that the lower surface 136 of the lens 130 directly contacts the upper surface of the substrate 110. In addition, the light emitting diode chip 120 is disposed on the upper surface of the substrate 110, on which the lens 130 is disposed. Accordingly, the light emitting diode chip 120 and the lens 130 may be disposed on the substrate 110 to be flush with each other thereon. Exemplary embodiments, however, are not limited thereto or thereby.

In addition, the light emitting diode chip 120 may be disposed within (e.g., underlie) a concave shape of the light incident surface 132 of the lens 130. Here, the light emitting diode chip 120 may be disposed therein such that a central axis of the light emitting diode chip 120 is placed on the central axis IC of the light incident surface 132. Accordingly, light emitted through the upper and side surfaces of the light emitting diode chip 120 can enter the lens 130 through the concave light incident surface 132a and the convex light incident surface 132b of the lens 130.

A light emission pattern in which light emitted from the light emitting diode chip 120 enters the light incident surface 132 of the lens 130 will be described below. Prior to description of the light emission pattern, locations of the light incident surface 132 and the light exit surface 134 of the lens 130 will be described.

Referring to FIG. 4, which is a cross-sectional view taken along sectional line A-A' of FIG. 3, it can be confirmed that the central axis IC of the light incident surface 132 is not coincident with a central axis EC of the light exit surface 134. In this manner, the light incident surface 132 and the light exit surface 134 may be placed at different locations such that light emitted from the light emitting diode chip 120 can be biased toward one direction when discharged to the outside, e.g., an ambient environment.

Referring again to FIG. 3, the light emitting diode chip 120 may be disposed at the center (or central portion) of the substrate 110, and the light incident surface 132 may have an elliptical shape with reference to the light emitting diode chip 120. In other exemplary embodiments, a major axis direction and a minor axis direction of the light incident surface 132 may be different from those associated with the previously described structure. Furthermore, the shape of the light incident surface 132 is not limited to an elliptical shape. For instance, the light incident surface 132 may be a circular shape, or any other suitable shape.

The light exit surface 134 of the lens 130 may be placed at a location biased to one side of the major axis direction of the light incident surface 132 having an elliptical shape. Accordingly, light emitted through the light exit surface 134 of the lens 130 can be more broadly discharged in a direction to which the light exit surface 134 is biased than in a direction to which the light exit surface 134 is not biased. That is, referring to FIG. 3, the light emitting module 100 can discharge light in a broader region in an upper direction than in a lower direction with reference to line B-B'. Therefore, as shown in FIG. 4, the central axis EC of the light exit surface 134 is not coincident with the central axis IC of the light incident surface 132, and can be biased to one side, as compared with the light incident surface 132.

In addition, referring to FIG. 5, which is a cross-sectional view taken along sectional line B-B' of FIG. 3, the central axis EC of the light exit surface 134 is coincident with the central axis IC of the light incident surface 132, and the lens 130 is bisymmetrical with respect to the central axis IC of the light incident surface 132. Accordingly, light emitted from the light emitting diode chip 120 can be bisymmetrically discharged in a state shown in FIG. 5.

Referring to FIG. 5, in some exemplary embodiments, the light exit surface 134 of the lens 130 includes a concave light exit surface 134a disposed on the central axis EC of the light exit surface 134, and convex light exit surfaces 134b disposed at opposite sides of the concave light exit surface 134a. Accordingly, light emitted from the light emitting diode chip 120 can be discharged in a relatively broad region through the convex light exit surfaces 134b.

As described above, the light incident surface 132 includes the concave light incident surface 132a and the convex light incident surface 132b, which extends from the concave light incident surface 132a to the lower surface 136 of the lens 130. Here, with reference to the cross-sectional views of FIGS. 4 and 5, a border region between the convex light incident surface 132b and the concave light incident surface 132a is defined as a first point P1 corresponding to an inflection point. In addition, a central point of the convex light incident surface 132b is defined as a second point P2 and a border point between the convex light incident surface 132b and the lower surface 136 is defined as a third point P3. With reference to the upper surface of the substrate 110, height d1 of the light emitting diode chip 120 is smaller than height d2 of the first point P1. That is, the light emitting diode chip 120 is disposed between the first point P1 and the third point P3 in the vertical direction, e.g., perpendicular to the upper surface of the substrate 110. Accordingly, most of the light emitted through the side surface of the light emitting diode chip 120 enters the lens 130 through the convex light incident surface 132b. In addition, the height d1 of the light emitting diode chip 120 may be greater than the height d3 of the second point P2.

According to various exemplary embodiments, with a structure having the light emitting diode chip 120 disposed between the first point P1 and the third point P3 in the vertical direction, light emitted from the light emitting diode chip 120 can be discharged through the light exit surface 134 of the lens 130 when discharged through the lens 130 while minimizing (or at least reducing) discharge of light through the flange 138 of the lens 130.

FIGS. 6A, 6B, 6C, 6D, 6E, and 6F are views illustrating light emission patterns from the light emitting module of FIG. 4 according to some exemplary embodiments.

Light emission patterns of the light emitting module 100 will be described with reference to FIGS. 6A-6E. That is, FIGS. 6A-6E shows emission patterns of light emitted in a broad region from the light emitting module 100 through the lens 130, in which the light incident surface 132 and the light exit surface 134 are asymmetrically disposed, as shown in FIG. 4.

Figure 6A:
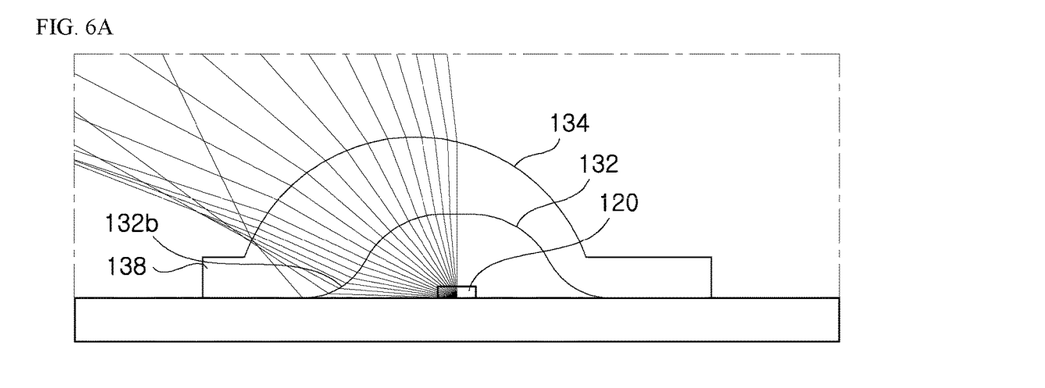
FIGS. 6A, 6B, 6C, 6D, 6E, and 6F are views illustrating light emission patterns from the light emitting module of FIG. 4 according to some exemplary embodiments.

FIG. 6A shows an emission pattern of light emitted from the center of the light emitting diode chip 120 in a range of 0 to 90 degrees. Light emitted from the light emitting diode chip 120 enters the lens 130 through the light incident surface 132 of the lens 130 and is discharged through the light exit surface 134 of the lens 130. It can be confirmed that light emitted from the light emitting diode chip 120 in the vertical direction is asymmetrically refracted by the light exit surface 134 of the lens 130. In addition, it can be confirmed that light emitted through the side surface of the light emitting diode chip 120 is refracted in an upper direction of the lens 130 by the convex light incident surface 132b of the light incident surface 132 of the lens 130, and is then discharged through the light exit surface 134 of the lens 130 without being discharged towards the flange 138.

Figure 6B:
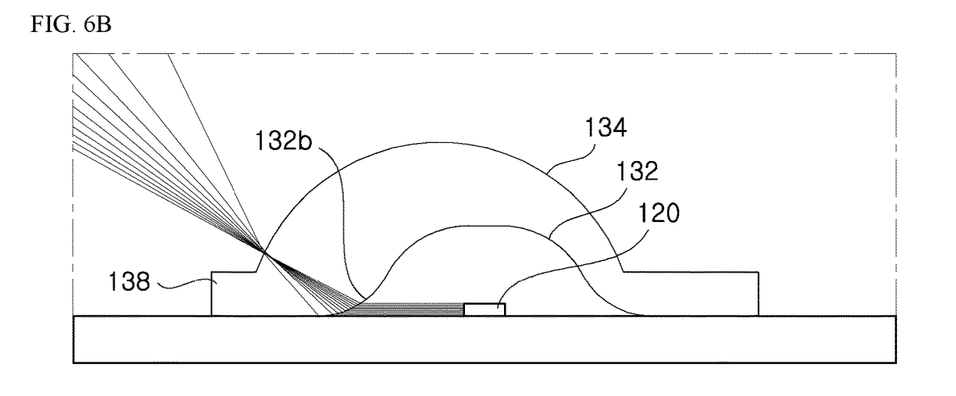

FIG. 6B shows an emission pattern of light emitted through the side surface of the light emitting diode chip 120 in the horizontal direction. Light emitted through the side surface of the light emitting diode chip 120 in the horizontal direction enters the lens 130 through the convex light incident surface 132b of the lens 130. As a result, it can be confirmed that the light is refracted by the convex light incident surface 132b in the upper direction of the lens 130 and is then discharged through the light exit surface 134 of the lens 130. If the light emitted through the side surface of the light emitting diode chip 120 is not refracted by the convex light incident surface 132b, the light enters the flange 138 and is then discharged through the flange 138 after being reflected within the flange 138 or is totally reflected therein, thereby causing light loss. According to various exemplary embodiments, the light emitted through the side surface of the light emitting diode chip 120 is refracted in the upper direction of the lens 130 by the convex light incident surface 132b so as to be discharged through the light exit surface 134, thereby minimizing (or at least reducing) light loss.

Figure 6C:
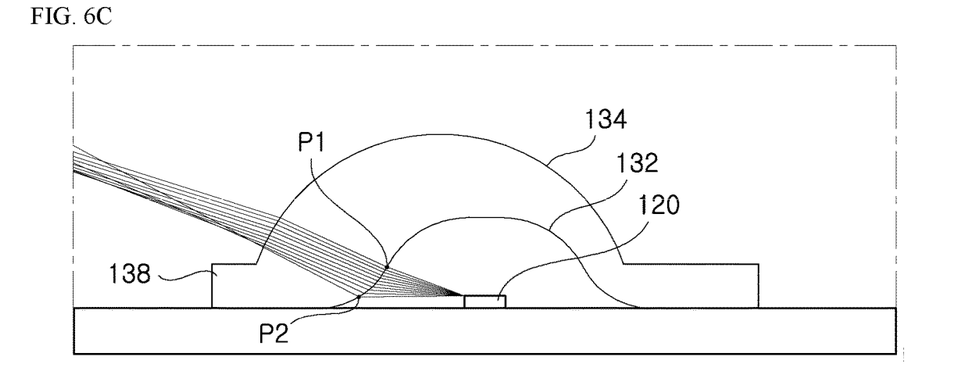

FIG. 6C shows an emission pattern of light emitted through a side upper portion of the light emitting diode chip 120 and passing through a space between the first point P1 and the second point P2 of the light incident surface 132. When light emitted from the light emitting diode chip 120 enters the lens 130 through the first point P1 of the light incident surface 132, the light undergoes substantially no refraction. In addition, it can be confirmed that the light is significantly refracted in the upper direction of the lens 130 when entering the lens 130 through the second point P2. Accordingly, it can be confirmed that most of the light emitted through the side upper portion of the light emitting diode chip 120 is discharged through the light exit surface 134.

Figure 6D:
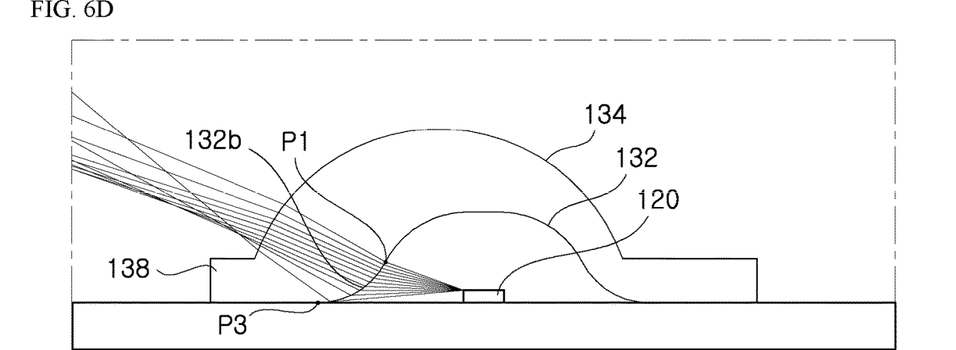

FIG. 6D shows an emission pattern of light emitted through the side upper portion of the light emitting diode chip 120 and passing through a space between the first point P1 and the third point P3 of the light incident surface 132. When light emitted from the light emitting diode chip 120 enters the lens 130 through the first point P1 of the light incident surface 132, the light undergoes substantially no refraction. In addition, it can be confirmed that the light is significantly refracted in the upper direction of the lens 130 when entering the lens 130 through the third point P3. Here, the light emitted through the side upper portion of the light emitting diode chip 120 towards the third point P3 does not reach the third point P3 due to the curvature of the convex light incident surface 132b and enters the lens 130 through the convex light incident surface 132b. Even in this case, it can be confirmed that the light undergoes more refraction than when entering the lens 130 through the first point P1 and travels in the upper direction of the lens 130 to be discharged through the light exit surface 134.

Figure 6E:
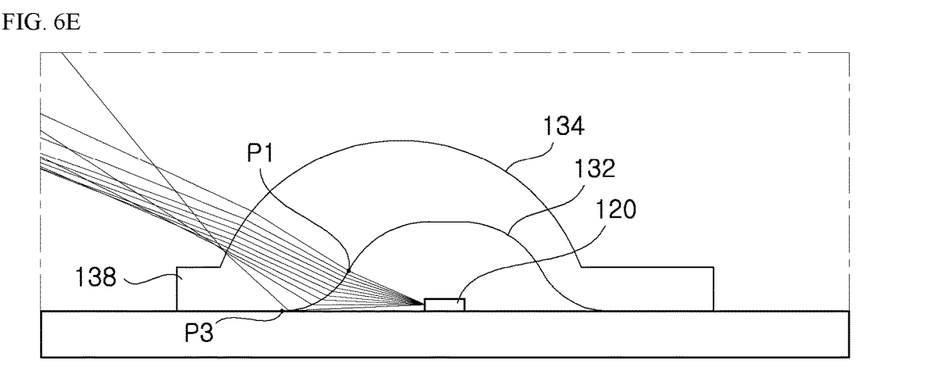

FIG. 6E shows an emission pattern of light emitted through a side middle portion of the light emitting diode chip 120 and passing through a space between the first point P1 and the third point P3 of the light incident surface 132. It can be confirmed that the light emitted from the light emitting diode chip 120 undergoes slight refraction when entering the lens 130 through the first point P1 of the light incident surface 132. In addition, it can be confirmed that the light entering the lens 130 through the third point P3 undergoes substantial refraction in the upper direction of the lens 130. Like the emission pattern of FIG. 6D, the light emitted through the side middle portion of the light emitting diode chip 120 towards the third point P3 does not reach the third point P3 due to the curvature of the convex light incident surface 132b and enters the lens 130 through the convex light incident surface 132b. Even in this case, it can be confirmed that the light undergoes more refraction than when entering the lens 130 through the first point P1 and travels in the upper direction of the lens 130 to be discharged through the light exit surface 134.

Figure 6F:
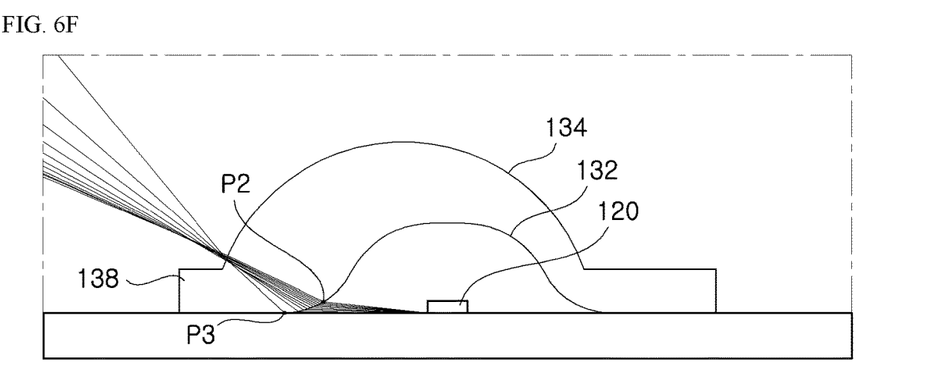

FIG. 6F shows an emission pattern of light emitted through a side lower portion of the light emitting diode chip 120 and passing through a space between the second point P2 and the third point P3 of the light incident surface 132. It can be confirmed that the light emitted from the light emitting diode chip 120 is refracted in the upper direction of the lens 130 when entering the lens 130 through the second point P2 of the light incident surface 132. In addition, it can be confirmed that the light entering the lens 130 through the third point P3 undergoes substantial refraction in the upper direction of the lens 130. Particularly, the light emitted through the side lower portion of the light emitting diode chip 120 reaches the third point P3 and enters the lens 130 through the third point P3. Here, it can be confirmed that the light undergoes considerable refraction in the upper direction of the lens 130 at the third point P3. As a result, it can be confirmed that most of the light emitted through the side lower portion of the light emitting diode chip 120 is discharged through the light exit surface 134 without being discharged towards the flange 138.

FIGS. 7A, 7B, 7C, 7D, 7E, and 7F are views illustrating light emission patterns from the light emitting module of FIG. 5 according to some exemplary embodiments.

Light emission patterns of the light emitting module 100 will be described with reference to FIG. 7. That is, FIG. 7 shows emission patterns of light emitted from the light emitting module 100 through the lens 130, in which the light incident surface 132 and the light exit surface 134 are symmetrically disposed, as shown in FIG. 5.

Figure 7A:
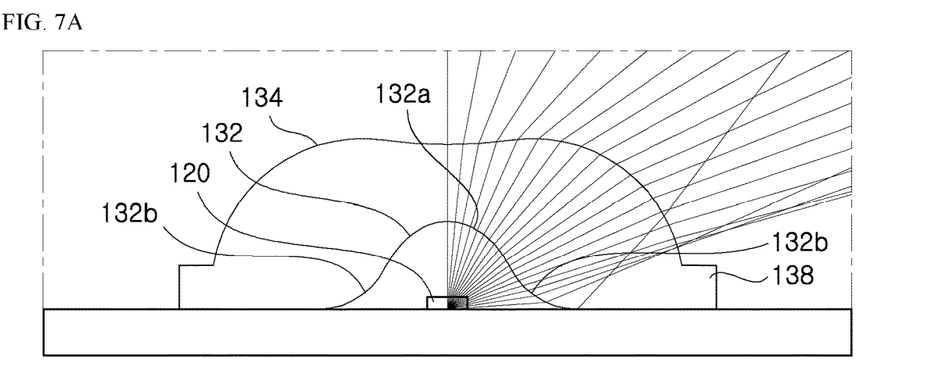
FIGS. 7A, 7B, 7C, 7D, 7E, and 7F are views illustrating light emission patterns from the light emitting module of FIG. 5 according to some exemplary embodiments.

FIG. 7A shows an emission pattern of light emitted from the center of the light emitting diode chip 120 in a range of 0 to 90 degrees. Light emitted from the light emitting diode chip 120 enters the lens 130 through the light incident surface 132 of the lens 130 and is discharged through the light exit surface 134 of the lens 130. It can be confirmed that light emitted from the light emitting diode chip 120 in the vertical direction is discharged through the light exit surface 134 of the lens 130 in the vertical direction. In addition, it can be confirmed that the light emitted from the light emitting diode chip 120 is refracted when entering the lens 130 through the concave light incident surface 132a and is refracted in a lateral direction when discharged through the light exit surface 134 of the lens 130.

Further, it can be confirmed that the light emitted from the light emitting diode chip 120 is refracted through the convex light incident surface 132b in the upper direction of the lens 130 when entering the lens 130 and is refracted in the lateral direction through the light exit surface 134 when exiting the lens 130. As a result, it can be confirmed that the light emitted from the light emitting diode chip 120 broadly spreads through the lens 130 in the lateral direction, and that the light having entered the lens 130 through the convex light incident surface 132b is discharged through the light exit surface 134 of the lens 130 without being discharged towards the flange 138.

Figure 7B:
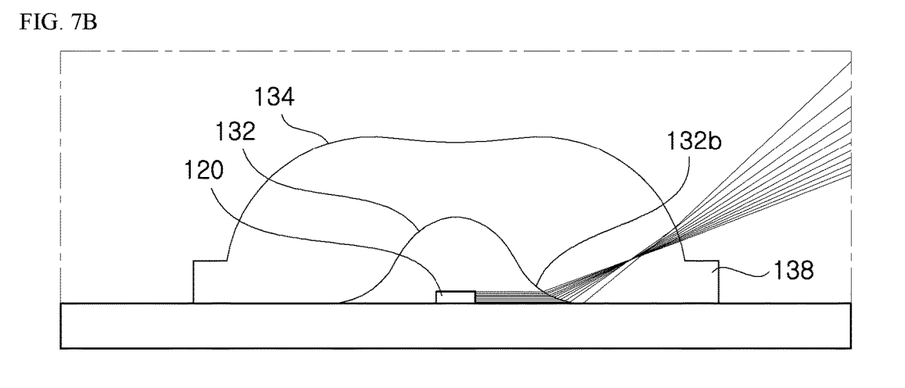

FIG. 7B shows an emission pattern of light emitted through the side surface of the light emitting diode chip 120 in the horizontal direction. Light emitted through the side surface of the light emitting diode chip 120 in the horizontal direction enters the lens 130 through the convex light incident surface 132b of the lens 130. As a result, it can be confirmed that the light is refracted by the convex light incident surface 132b in the upper direction of the lens 130 and is then discharged through the light exit surface 134 of the lens 130. As shown in FIG. 7B, if the light emitted through the side surface of the light emitting diode chip 120 is not refracted by the convex light incident surface 132b of the lens 130, the light enters the flange 138 and is then discharged through the flange 138 after being reflected within the flange 138 or is totally reflected therein, thereby causing light loss. Accordingly, the light emitted through the side surface of the light emitting diode chip 120 is refracted in the upper direction of the lens 130 through the convex light incident surface 132b so as to be discharged through the light exit surface 134 without being discharged through the flange 138, thereby minimizing (or at least reducing) light loss.

Figure 7C:
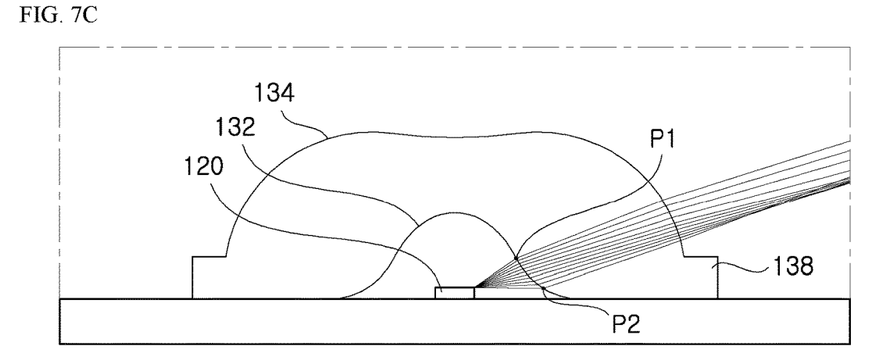

FIG. 7C shows an emission pattern of light emitted through a side upper portion of the light emitting diode chip 120 and passing through a space between the first point P1 and the second point P2 of the light incident surface 132. It can be confirmed that the light emitted from the light emitting diode chip 120 is refracted in the lateral direction of the lens 130 when entering the lens 130 through the first point P1 of the light incident surface 132. In addition, it can be confirmed that light entering the lens 130 through the second point P2 is refracted in the upper direction of the lens 130. Accordingly, it can be confirmed that the light emitted through the side upper portion of the light emitting diode chip 120 is discharged in a broader region through the light exit surface 134 in the lateral direction of the lens 130 without being discharged through the flange 138.

Figure 7D:
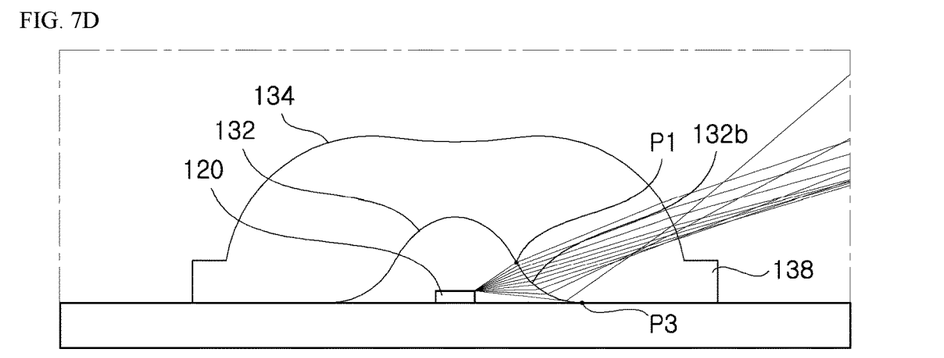

FIG. 7D shows an emission pattern of light emitted through the side upper portion of the light emitting diode chip 120 and passing through a space between the first point P1 and the third point P3 of the light incident surface 132. It can be confirmed that the light emitted from the light emitting diode chip 120 is refracted in the lateral direction of the lens 130 when entering the lens 130 through the first point P1 of the light incident surface 132. In addition, it can be confirmed that the light entering the lens 130 through the third point P3 is refracted in the upper direction of the lens 130. Here, the light emitted through the side upper portion of the light emitting diode chip 120 towards the third point P3 does not reach the third point P3 due to the curvature of the convex light incident surface 132b and enters the lens 130 through the convex light incident surface 132b. Even in this case, it can be confirmed that the light undergoes more refraction than when entering the lens through the first point P1 and travels in the upper direction of the lens 130 to be discharged through the light exit surface 134.

Figure 7E:
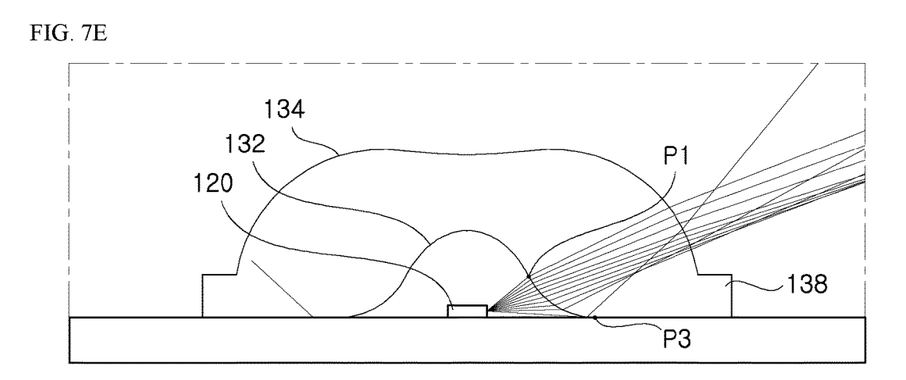

FIG. 7E shows an emission pattern of light emitted through a side middle portion of the light emitting diode chip 120 and passing through a space between the first point P1 and the third point P3 of the light incident surface 132. It can be confirmed that the light emitted from the light emitting diode chip 120 undergoes refraction in the lateral direction when entering the lens 130 through the first point P1 of the light incident surface 132. In addition, it can be confirmed that the light entering the lens 130 through the third point P3 undergoes refraction in the upper direction of the lens 130. Like the emission pattern of FIG. 7D, the light emitted through the side middle portion of the light emitting diode chip 120 towards the third point P3 does not reach the third point P3 due to the curvature of the convex light incident surface 132b and enters the lens 130 through the convex light incident surface 132b. Even in this case, it can be confirmed that the light undergoes more refraction than when entering the lens 130 through the first point P1 and travels in the upper direction of the lens 130 to be discharged through the light exit surface 134.

Figure 7F:
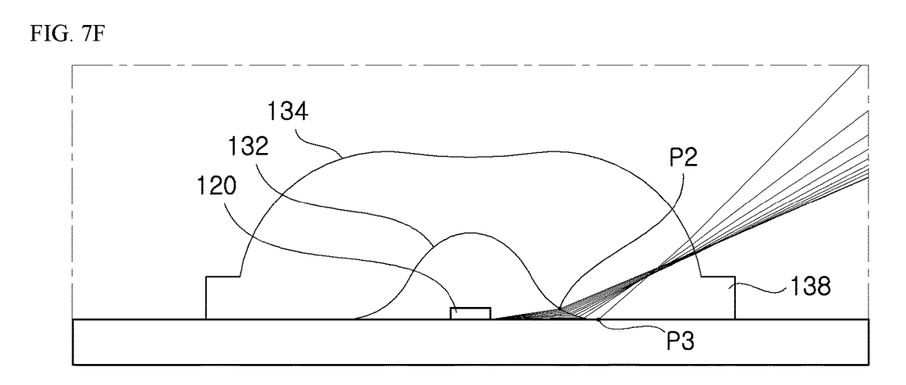

FIG. 7F shows an emission pattern of light emitted through a side lower portion of the light emitting diode chip 120 and passing through a space between the second point P2 and the third point P3 of the light incident surface 132. It can be confirmed that the light emitted from the light emitting diode chip 120 is refracted in the upper direction of the lens 130 when entering the lens 130 through the second point P2 of the light incident surface 132. In addition, it can be confirmed that the light entering the lens 130 through the third point P3 undergoes substantial refraction in the upper direction of the lens 130. Particularly, the light emitted through the side lower portion of the light emitting diode chip 120 reaches the third point P3 and enters the lens 130 through the third point P3. Here, it can be confirmed that the light undergoes considerable refraction in the upper direction of the lens 130 at the third point P3. As a result, it can be confirmed that most of the light emitted through the side lower portion of the light emitting diode chip 120 is discharged through the light exit surface 134 without being discharged towards the flange 138.

Figure 8:
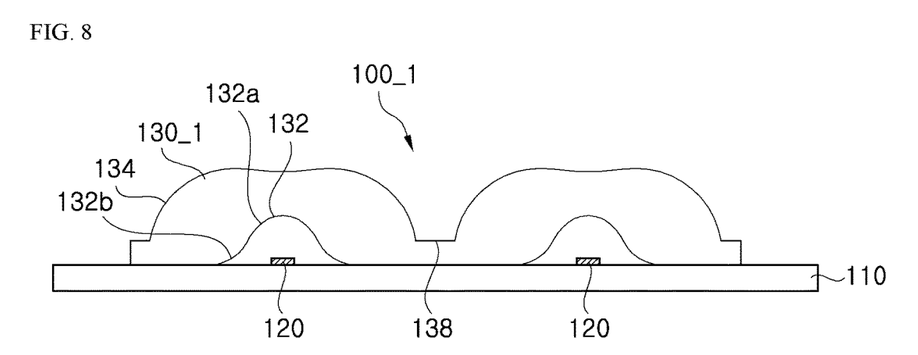
FIG. 8 is a sectional view of a light emitting module according to some exemplary embodiments.

FIG. 8 is a sectional view of a light emitting module according to some exemplary embodiments. To avoid obscuring exemplary embodiments, descriptions of the same or similar components as previously described will be primarily omitted.

Referring to FIG. 8, a light emitting module 100_1 includes at least two light emitting diode chips 120 and at least two lenses 130_1 on one substrate 110. Specifically, two or more light emitting diode chips 120 are mounted on one substrate 110, and a lens 130_1 having light incident surfaces 132 is disposed to cover each of the light emitting diode chips 120. The lens 130_1 may include at least two light incident surfaces 132 and at least two light exit surfaces 134. That is, two lenses 130_1 having the structure previously described in association with lens 130 are arranged parallel (or adjacent) to each other and are coupled to each other.

The flange 138 serves to connect the at least two lenses 130_1 to each other. Accordingly, when light emitted through the side surface of the light emitting diode chip 120 travels towards the flange 138, the light can often disappear through infinite reflection within the lens 130_1 instead of being discharged to the outside. However, as previously described, the light incident surface 132 of the lens 130_1 includes a concave light incident surface 132a and a convex light incident surface 132b, and light emitted through the side surface of the light emitting diode chip 120 is refracted in the upper direction of the lens 130_1 when entering the lens 130_1 through the convex light incident surface 132b. As a result, most of the light emitted through the side surface of the light emitting diode chip 120 can be discharged through the light exit surface 134 of the lens 130_1 instead of being discharged towards the flange 138. In this manner, both a fraction of light emitted through the upper side of the light emitting diode chip 120 and a fraction of light emitted through the side surface of the light emitting diode chip 120 are discharged through the light exit surface 134 of the lens 130_1, thereby improving luminous efficacy of the light emitting module 100_1.

Figure 9:
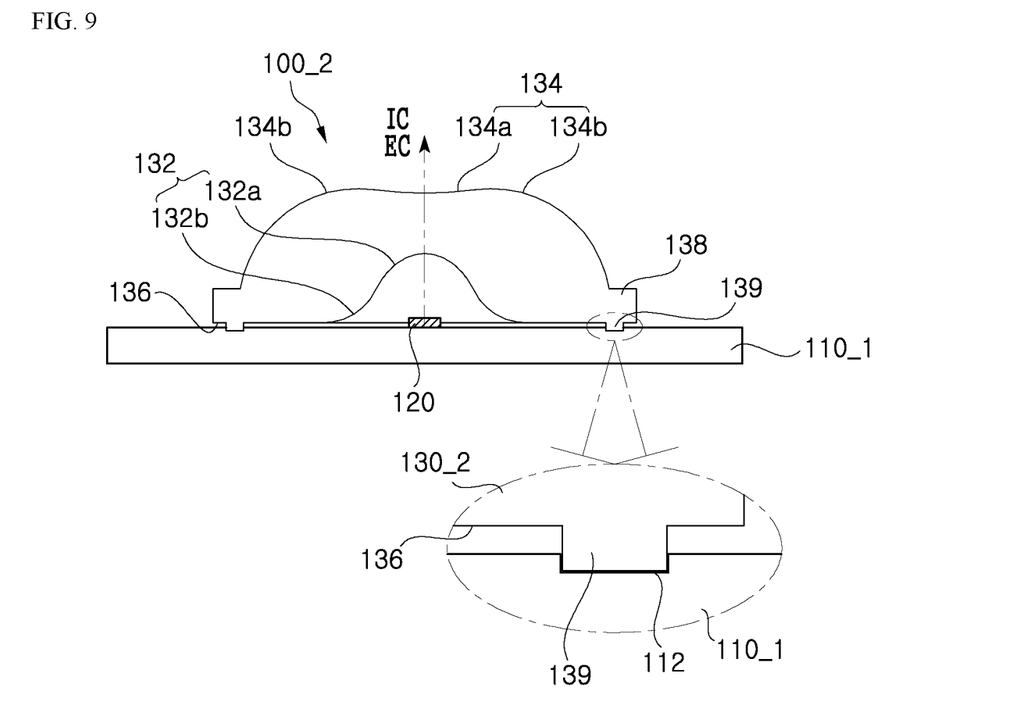
FIG. 9 is a sectional view of a light emitting module according to some exemplary embodiments.

FIG. 9 is a sectional view of a light emitting module according to some exemplary embodiments. To avoid obscuring exemplary embodiments, descriptions of the same or similar components as previously described will be primarily omitted.

The light emitting module 100_2 includes a substrate 110_1, a light emitting diode chip 120, and a lens 130_2.

The substrate 110_1 is generally the same as the substrate 110 of the light emitting module 100, and may further include securing grooves 112 that secure the lens 130_2. The securing grooves 112 may have a shape corresponding to a shape of legs 139 such that the legs 139 of the lens 130_2 can be inserted into and secured by the securing grooves 112. In addition, the securing grooves 112 may be provided in plural and the number of securing grooves 112 may be the same as the number of legs 139 of the lens 130_2.

The light emitting diode chip 120 may be mounted on the upper surface of the substrate 110_1 at the same location as that of the light emitting diode chip 120 previously described in association with FIGS. 1-5.

The lens 130_2 has a light incident surface 132 and a light exit surface 134 in order to spread or collect light emitted from the light emitting diode chip 120. In some exemplary embodiments, the lens 130_2 has a flange 138 outside the light exit surface 134 and may include a lower surface 136 connecting the light incident surface 132 to the flange 138. In addition, as described above, the lens 130_2 may include a plurality of legs 139. The plurality of legs 139 serves to support and secure the lens 130_2 on the substrate 110_1. In exemplary embodiments, the plurality of legs 139 may be inserted into the securing grooves 112 formed on the upper surface of the substrate 110_1 so as to secure the lens 130_2 on the substrate 110_1. Each of the legs 139 may be bonded to the securing groove 112 by a bonding agent.

According to some exemplary embodiments, since the legs 139 are formed on a lower side of the lens 130_2, the lower surface 136 of the lens 130_2 may be separated (e.g., spaced apart) from the substrate 110_1. With this structure, light emitted through the side surface of the light emitting diode chip 120 can enter the lens 130_2 at a location as close to a first point P1 corresponding to a border between the convex light incident surface 132b of the lens 130_2 and the lower surface 136 as possible.

In some exemplary embodiments, the structure having the lower surface 136 of the lens 130_2 separated from the upper surface of the substrate 110 by the legs 139 formed on the lower side of the lens 130_2 enables a separation distance between the lower surface 136 of the lens 130_2 and the upper surface of the substrate 110_1 to be smaller than the height of the light emitting diode chip 120. That is, the lower surface 136 of the lens 130_2 is not placed below the upper surface of the light emitting diode chip 120. In addition, the separation distance between the lower surface 136 of the lens 130_2 and the upper surface of the substrate 110_1 may be half or less than the height of the light emitting diode chip 120.

Accordingly, the light emitting module 100_2 allows light emitted through the side surface of the light emitting diode chip 120 to enter the lens 130_2 through the convex light incident surface 132b of the lens 130_2 and to be discharged through the lens 130_2 in a desired direction. Although the securing grooves 112 are formed on the upper surface of the substrate 110_1, the securing grooves 112 can be omitted, and the legs 139 of the lens 130 may be secured to the upper surface of the substrate 110_1 in a state of contacting the upper surface.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A light emitting module comprising:
   a substrate;
   a light emitting diode chip on the substrate; and
   a lens coupled to the substrate, the lens covering the light emitting diode chip,
   wherein the lens comprises:
      a light incident surface to receive light from the light emitting diode chip;
      a light exit surface to output the light from the lens; and
      a lower surface extending from an edge of the light incident surface towards an edge of the light exiting surface,
   wherein the light incident surface comprises:
      a concave light incident surface overlapping the light emitting diode chip; and
      a convex light incident surface extending from the concave light incident surface,
   wherein the lower surface of the lens abuts an upper surface of the substrate, and
   wherein a height of the light emitting diode chip from the upper surface of the substrate is smaller than a height from the upper surface of the substrate to a border between the concave light incident surface and the convex light incident surface.

2. The light emitting module according to claim 1, wherein a lower surface of the light emitting diode chip is flush with the lower surface of the lens on the upper surface of the substrate.

3. The light emitting module according to claim 1, wherein the convex light incident surface extends from the concave light incident surface to the lower surface of the lens.

4. The light emitting module according to claim 3, wherein a side upper end of the light emitting diode chip is between a border between the concave light incident surface and the convex light incident surface and a border between the convex light incident surface and the lower surface of the lens.

5. The light emitting module according to claim 1, wherein the lens further comprises a flange connecting the light exit surface to the lower surface of the lens.

6. The light emitting module according to claim 1, wherein locations of a central axis of the light incident surface and a central axis of the light exit surface are different.

7. The light emitting module according to claim 1, wherein the light exit surface comprises:
   two convex light exit surfaces; and
   a concave light exit surface between the two convex light exit surfaces, the concave light exit surface connecting the two convex light exit surfaces.

8. The light emitting module according to claim 1, wherein the light emitting diode chip is configured to emit light through upper and side surfaces of the light emitting diode chip.

9. The light emitting module according to claim 8, wherein the light emitting diode chip comprises:
   a pair of electrode pads; and
   a light emitting structure overlapping the pair of electrode pads, the light emitting structure comprising an n-type semiconductor layer, a p-type semiconductor layer, and an active layer between the n-type semiconductor layer and the p-type semiconductor layer.

10. The light emitting module according to claim 9, wherein the light emitting diode chip further comprises a phosphor layer covering upper and side surfaces of the light emitting structure, the phosphor layer being configured to convert wavelengths of light emitted from the light emitting structure.

11. The light emitting module according to claim 1, wherein the lens further comprises a plurality of legs on the lower surface, the plurality of legs contacting the substrate.

12. The light emitting module according to claim 11, wherein the substrate comprises a plurality of securing grooves configured to receive the plurality of legs.

13. The light emitting module according to claim 1, wherein the light emitting diode chip is one of a plurality of light emitting diode chips on the substrate.

14. A lens comprising:
   a light incident surface configured to receive light from a light emitting diode chip disposed on an upper surface of a substrate;
   a light exit surface configured to output the light from the lens; and
   a lower surface extending from an edge of the light incident surface towards an edge of the light exiting surface,
   wherein the light incident surface comprises:
      a concave light incident surface configured to overlap the light emitting diode chip; and
      a convex light incident surface extending from the concave light incident surface,
   wherein the lower surface of the lens abuts the upper surface of the substrate, and
   wherein a height of the light emitting diode chip from the upper surface of the substrate is smaller than a height from the upper surface of the substrate to a border between the concave light incident surface and the convex light incident surface.

15. The lens according to claim 14 wherein the lens is configured to overlap the light emitting diode chip such that the lower surface of the lens is flush with a lower surface of the light emitting diode chip.

16. The lens according to claim 15, wherein the convex light incident surface extends from the concave light incident surface to the lower surface of the lens.

17. The lens according to claim 14, wherein the light exit surface comprises:
   two convex light exit surfaces; and
   a concave light exit surface between the two convex light exit surfaces, the concave light exit surface connecting the two convex light exit surfaces.

18. The lens according to claim 14, further comprising:
   a plurality of legs on the lower surface of the lens, the plurality of legs being configured to contact the substrate upon which the light emitting diode is disposed.

19. The lens according to claim 14, wherein the light incident surface is configured to overlap a plurality of light emitting diode chips, the plurality of light emitting diode chips comprising the light emitting diode chip.

* * * * *